United States Patent [19]

Brockel et al.

[11] Patent Number: 5,669,063
[45] Date of Patent: Sep. 16, 1997

[54] METHOD OF ESTABLISHING LINE OF SIGHT PROPAGATION

[75] Inventors: Kenneth H. Brockel, Neptune; William P. Sudnikovich, Laurence Harbor; Joseph Inserra, Toms River; Francis Loso, Keyport; Kerri E. Schulz, Bricktown, all of N.J.

[73] Assignee: The United States of America as represented by the Secretary of the Army, Washington, D.C.

[21] Appl. No.: 668,870

[22] Filed: Jun. 24, 1996

Related U.S. Application Data

[63] Continuation-in-part of Ser. No. 437,861, May 8, 1995, abandoned, which is a continuation of Ser. No. 952,448, Sep. 28, 1992, abandoned.

[51] Int. Cl.$^6$ .................................................. H04B 7/26
[52] U.S. Cl. ............................ 455/506; 455/10; 455/65; 455/67.6
[58] Field of Search .......................... 455/10, 33.1, 52.1, 455/52.2, 52.3, 62, 63, 67.1, 67.6, 69, 65

[56] References Cited

U.S. PATENT DOCUMENTS

| | | | |
|---|---|---|---|
| 3,745,464 | 7/1973 | Lee | 455/65 |
| 4,776,035 | 10/1988 | Duggan | 455/52.2 |
| 4,896,369 | 1/1990 | Adams, Jr. et al. | 455/10 |
| 5,109,390 | 4/1992 | Gilhousen et al. | 455/52.3 |
| 5,390,338 | 2/1995 | Bodin et al. | 455/67.6 |
| 5,410,736 | 4/1995 | Hogue | 455/52.1 |

OTHER PUBLICATIONS

Lee, William "Mobile Communication Design Fundamentals" pp. 51–91, Pactel Mobile Company, (Library of Congress Catalog No. 85–61772), 1986.

*Primary Examiner*—Reinhard J. Eisenzopf
*Assistant Examiner*—Thanh Le
*Attorney, Agent, or Firm*—Michael Zelenka; William H. Anderson

[57] ABSTRACT

A method of automatically determining the reliability of any LOS radio link given certain parameters. Specifically, this method allows a communications network operator to specify and determine the path reliability (PR) for each backbone and extension link in a communications network for a given operating frequency, path length and climatic factor. For each link, the fade margin required (RFM) for a desired path reliability (PRD) is calculated. Then, the actual fade margin of the selected link is calculated using known radio parameters. Preferably, these known radio parameters are stored in a database to facilitate access to this information. Then, the corresponding value of the actual path reliability for the link is calculated using modifications of known statistical models which take into account climatic and geographic factors.

1 Claim, 6 Drawing Sheets

METHOD OF ESTABLISHING LINE OF SIGHT PROPAGATION

CONTINUATION-IN-PART

This application is a continuation-in-part of U.S. Ser. No. 08/437,861, entitled, "Method of Establishing Line of Sight Propagation," filed May 8, 1995, Attorney Docket No. CECOM-5178, now abandoned, which was a continuation of U.S. Ser. No. 07/952,448, filed Sep. 28, 1992, Attorney Docket No. CECOM-4796, now abandoned. Priority of these parent applications is claimed.

GOVERNMENT INTEREST

The invention described herein may be manufactured, used, sold, imported and/or licensed by, or on behalf of, the Government of the United States of America without the payment to us of any royalties thereon.

FIELD OF THE INVENTION

The present invention relates to methods of determining the reliability of line of sight radio wave propagation.

BACKGROUND OF THE INVENTION

Harsh climates encountered in areas, such as desert terrain in proximity to bodies of water, are known to be very difficult for Line-of-Sight (LOS) radio links because they cause frequent and large reductions in received signal strength. These signal strength variations occur because abnormal variations in the refractive index of the lower atmosphere cause multipath transmission and/or bending of beams emitted by the antenna. At frequencies below about 8 GHz and on paths having adequate clearance, these signal strength variations, otherwise known as time-varying fading, are generally of two main types: (1) atmospheric multipath interference, which occurs relatively rapidly and is caused by interference between two or more refracted rays arriving at the receiving antenna by different paths; and (2) reflection multipath interference, which occurs less rapidly and is due to interference between direct and ground-reflected waves. In terms of occurrence on a single radio link, multipath interference is the prevalent cause of degraded transmission reliability resulting from anomalous atmospheric structures. However, these two types of multipath fading can be present at the same time and the number of fades tends to increase with time due to atmospheric multipath increases along the path length.

The ability of a radio installation to withstand decreases in received signal strength is represented by its fade margin, i.e., the amount of power in dB that the average received signal strength exceeds the receiver threshold. Evaluation of known LOS radio systems shows that small fade margins of 4 to 6 dB were used in the past to accommodate for multipath fading. These fixed margins were originally disclosed in, "Radio Propagation Fundamentals," Bullington, K., The Bell System Technical Journal XXXVI(3), 1957, and were to provide for a link reliability of 90 percent for average climatic conditions. These margins, however, have since proven to be too small for difficult propagation environments and outdated in view of current LOS link engineering methodology, which includes parameters for climate, location, terrain, and path length.

Current LOS radio design requirements are based to a considerable degree on requirements and experience in Europe. However, propagation conditions in such countries as Germany are benign compared to those in the coastal areas of the Persian Gulf and in other warm and humid climates. A large body of research about LOS fading has been accumulated over the past 20 years, e.g., Vigants, "Number and Duration of Fades at 4 and 6 GHz," "Space-Diversity Engineering," and "Temporal Variability of Distance Dependence of Amplitude Dispersion and Fading," The Bell System Technical Journal 50(3)(1971) and 54(1) (1975) and Conference Record, International Conference of Communications, Amsterdam, the Netherlands (1984), respectively, and DCEC Engineering Publication (EP) 1–90, DCS Digital Line-of-Sight Link Design (1990). Much of this knowledge has its origin in the research performed for the engineering of commercial LOS links in the United States, where in the 1980s at least two-thirds of long distance communications traffic was routed over long-haul LOS microwave radio. The initiation of this propagation research was related to more efficient use of the frequency spectrum when the Federal Communications Commission reduced the number of frequency diversity protection channels from two to one in each frequency band. This required understanding of fading for a large variety of climatic conditions. The resulting models of fading and its countermeasures (frequency diversity and space diversity) permitted commercial link engineering to meet increasing reliability requirements related to increasing amounts of data transmission in any network. Subsequent introduction of microwave digital radio technology resulted in further propagation research on the in-band distortion of the frequency spectrum caused by multipath fading. The fading models developed from this research included meteorological variables. This permitted generation of an LOS propagation description for worldwide application when business opportunities arose related to providing microwave LOS communications to countries such as Saudi Arabia and other developing countries.

Today, the main focus is the single link propagation reliability defined as the percentage of time that the received signal strength is above the receiver's 10–5 Bit Error Rate (BER) threshold. Commercial systems employing modern digital radio typically require link reliabilities of 99.99 percent or better. These systems have been designed and are engineered on a per link basis to accommodate clear-air received signal decreases of 40 to 50 dB due to time varying fading of the received signal. It is important to note that commercial systems are designed for fixed-plant operation with generally good clearances and high antenna gains while military LOS radios are rapidly deployed and moved in operations where good sites and high-gain antennas are not the norm. The link engineering for these military digital radio systems, however, does not adequately take time-varying fading into account and does not incorporate results from the large body of recent published work on this topic.

SUMMARY OF THE INVENTION

Accordingly, the objective of the present invention is to provide a method of determining the reliability of military LOS radio links by calculating multipath fade margins using relevant environmental and operational radio parameters required to provide a specified link propagation reliability.

Another objective of the present invention is to provide for such a method which is applicable for a large range of climates, terrains, fade margins, and path lengths.

These and other objects of the invention are achieved by automatically determining the reliability of any LOS radio link given these parameters. Specifically, this method allows a communications network operator to specify and determine the path reliability (PR) for each backbone and extension link in a communications network for a given operating frequency, path length and climatic factor. For each link, the fade margin required (RFM) for a desired path reliability (PRD) is calculated by subroutines which will be explained more fully in the Detailed Description of the Invention. Then, the actual fade margin of the selected link is calculated using known radio parameters. Preferably, these known radio parameters are stored in a database to facilitate access to this information. Thereafter, the corresponding value of the actual path reliability for the link is calculated using modifications of known statistical models which take into account climatic and geographic factors.

In a preferred embodiment the present invention is an improved terrestrial, line of sight radio linked network having a predetermined number of terrestrial, line of sight radio transmitters and receivers, the terrestrial, line of sight radio transmitters and receivers having predetermined physical parameters and known multipath fade margin capabilities and being spaced over a predetermined distance and terrain, which includes:

an automated system and software program which automatically calculates a required multipath fade margin given a climatic factor, radio wave path inclination, desired reliability and radio frequency for each terrestrial, line of sight radio link;

a manner within the automated system and software program to compare the required multipath fade margin to the multipath fade margin capabilities;

a manner to alter the predetermined physical parameters of the terrestrial, line of sight radio transmitters and receivers if the difference between the multipath fade margin capabilities and the required multipath fade margin is less than or equal to zero; and a manner to alter the predetermined distance between the terrestrial, line of sight radio transmitters and receivers if the difference between the multipath fade margin capabilities and the required multipath fade margin is less than or equal to zero.

BRIEF DESCRIPTION OF THE DRAWINGS

Other features and details of the present invention will become apparent in light of the Detailed Description of the Invention and the accompanying figures wherein.

DETAILED DESCRIPTION OF THE INVENTION

Figure 1:
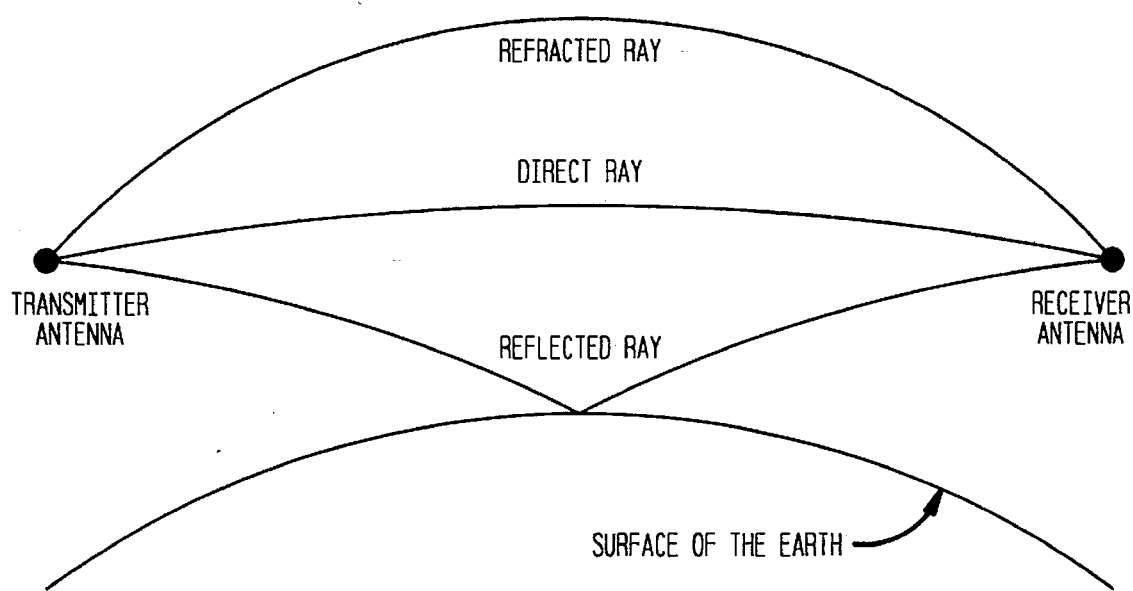
FIG. 1 is a schematic illustration of the various travel paths of destructive interfering multiple transmissions.

As described in the Background of the Invention, the principal cause of atmospheric multipath fading on LOS radio wave paths is an interference (cancellation) phenomenon that usually occurs when air masses of different temperatures and humidities overlie each other without mixing. Because these strata cause radio waves to travel different paths, the receiver is subject to two or more replicas of the transmitted signal as illustrated in FIG. 1. FIG. 1 also illustrates reflective multipath fading which can also generate one or more additional replicas of the signal. The replicas each with a different amplitude and phase, can and often do combine destructively to reduce the received signal strength by more than enough to cause unsatisfactory performance of the radio link. Typical durations of each interference event range from a few seconds (40-dB fade) to tens of seconds (20-dB fade) while the number of interference events in a night can range from fewer than ten to more than a hundred. The multipath-fading phenomenon is complex, time-varying, nonstationary, and dependent on many physical quantities. Nonetheless these physical effects may be compensated for by engineering the radio links with adequate fade margins which can be calculated for desired path reliabilities in the geographical locations and climates of interest. The present invention, therefore, compensates for multipath fading by first statistically analyzing climatic and geophysical structures and by calculating the required fade margin for a desired path reliability on any radio link given this statistical analysis and radio parameters.

In order to analyze the effects of climatic and geophysical structures on LOS radio wave propagation, certain atmospheric structures must be classified into physical quantities. For example, considering a normal daytime atmosphere where the index of refraction decreases gradually as the height above ground increases, the index of refraction may be measured in units, referred to as N-units, that describe the deviation of the index of refraction from unity, multiplied by $10^6$. Thus, a representative, ground-level index of refraction value of 0.000320 becomes a refractivity of 320 when expressed in N-units. In the standard daytime atmosphere, the decrease in height is essentially linear in the first km above ground. The rate of decrease (the gradient) is generally denoted as −40 N-units per km, which corresponds to the standard equivalent earth radius factor of 4/3 used as a baseline for engineering LOS links.

A statistical description of refractivity gradients occurring in nature is obtained by measuring the difference in refractivity at points that are separated in height by 100 meters. The result is a probability distribution of the gradient, expressed as a percent of time during which it exceeds a particular value. Such a distribution is illustrated qualitatively in FIG. 2, where the curve is broken up into straight-line segments corresponding to different atmospheric structures. The break points in the curve and the shape of the curve can change drastically with geophysical location.

The central portion of the curve around the gradient of −40 N-units/km represents linear gradients that affect terrain clearance and change the relative phases of ground-reflected rays. The multipath fading segment is centered on a −157 N-units/km value. The presence of such gradients creates multiple ray paths which can generate multipath fading. Experience indicates that gradients substantially more negative than −157 N-units/km are necessary to cause prolonged and severe reductions of received signal power related to ducting.

Referring to the other end of the probability distribution, a positive gradient can also cause prolonged and severe reductions of received signal power. This is a result of a temporary blockage of the LOS path, referred to generally as obstruction fading.

Figure 2:
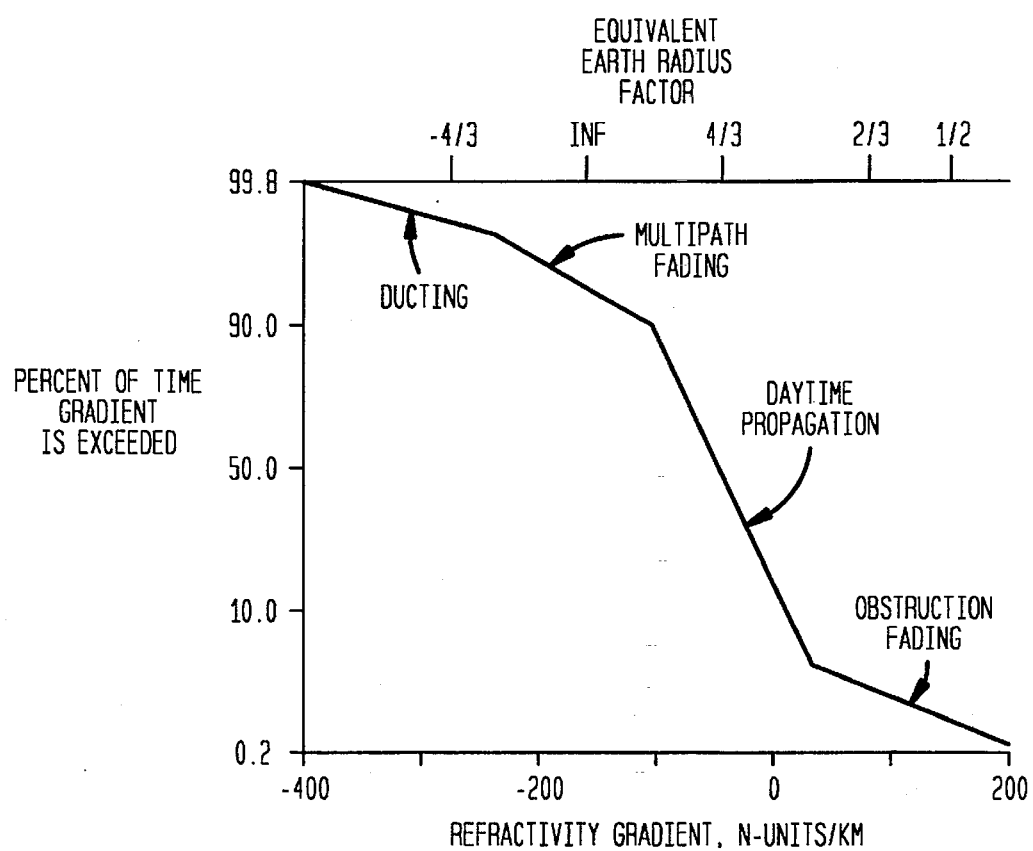
FIG. 2 is a graphical representation of typical atmospheric refractivity gradient as a function of percent of time the gradient is exceeded.

Generically, the probability of the daytime propagation regime is the largest (note that the percent scale in FIG. 2 is nonlinear, the so-called normal-probability scale). As shown, the probabilities of the ducting and obstruction fading regimes are relatively small, while the multipath fading regime has the largest probability among the anomalous propagation regimes.

Analytical models of multipath fading, formulated for the engineering of radio links, describe multipath fading in terms of the time during which the received signal power is smaller than a value of interest. The time is accumulated over all fades in a month, and it is usually expressed as a percentage of a month, denoted by P. As an example, a value of the fading probability P of 0.1 percent corresponds to approximately 44 minutes per month.

The received signal level is described in terms of fade depth, denoted by A, expressed in positive dB relative to the signal power in the absence of fading. Thus, if the received signal power of interest is one percent of the power in absence of fading, then the value of A is 20 dB.

For deep fades, when A is 20 dB or larger, the fading probability P has a simple analytical form $$P = 100 \, R \, 10^{-A/10}, \, A \geq 20$$

where R is the multipath-fade-occurrence factor. For example, if the fade occurrence factor is 0.1 and the fade depth is 20 dB, the probability of fading is 0.1 percent. This means that the received signal power is smaller than one percent of normal for a total of approximately 44 minutes in a month.

Figure 3:
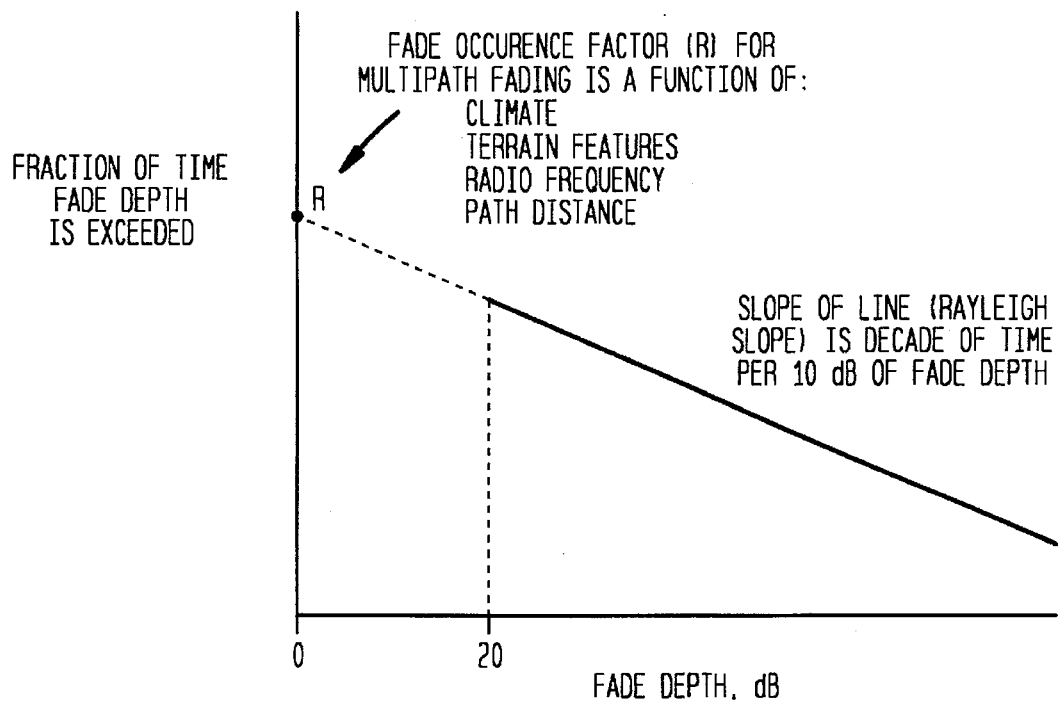
FIG. 3 is a graphical representation of a statistical description of deep multipath fading.
Figure 4:
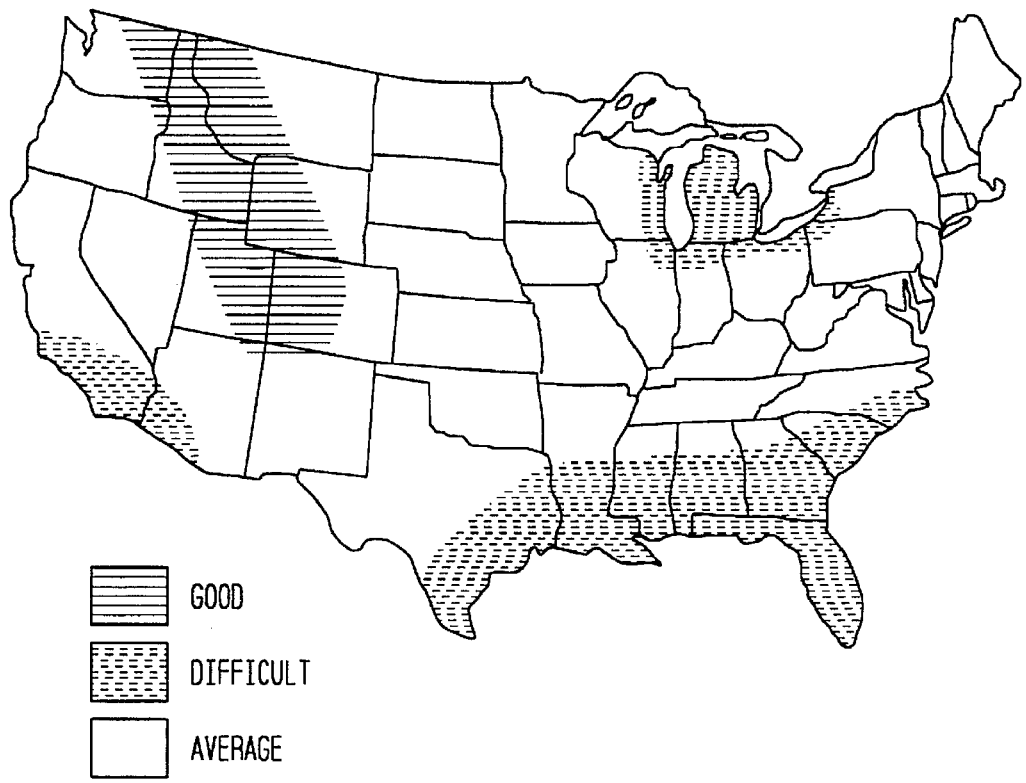
FIG. 4 is an illustration of the United States showing the geographic variability of propagation conditions.

The above behavior of the probability P as a function of the fade depth A is a consequence of basic physics. This behavior always occurs when fading is caused by multiple interfering rays. The probability is usually plotted on a vertical logarithmic scale as a function of fade depth on a horizontal linear scale. As shown in FIG. 3, this probability becomes a straight line on such a plot. The slope of the line is in decades of time (ratio of ten) per 10 dB of fade depth. This is referred to generally as the Rayleigh slope, after a theoretical probability function that describes the result of the interference of multiple rays. The vertical position of the fading probability line in FIG. 3 is determined by the fade-occurrence factor R, which is a function of climate, terrain features, radio frequency, and path distance. The functional form of R has been the subject of international propagation research for many years. A CONUS form for R, described in "Multipath Propagation at 4, 6 and 11 GHz," The Bell System Technical Journal, 51(2), Barnett, 1972, is $$R = 6 \, C \, F \, D^3 \, 10^{-10}$$

where D is the path length in km, and F is the radio frequency in MHz (greater than 2000 MHz). Values for the climate and terrain factor C are obtained from known maps. A low-resolution qualitative propagation map for CONUS is shown in FIG. 4. In terms of this map, for general planning purposes, C=1 is recommended for areas of average propagation conditions.

For difficult CONUS climates and terrains (e.g., the U.S. gulf coast), C=10 is recommended. The value of C=10 is also recommended for like international climates and terrains, e.g., Saudi Arabia. For worst case conditions, C=100 is recommended. This would be appropriate for cases of extreme heat and humidity such as the Red Sea or Persian Gulf coastal plain, or equatorial climates. For mountainous, dry, or northerly conditions, C=0.25 would be recommended. For example, this would be appropriate for the Rocky Mountains, Canada, and sections of Germany.

Given the path length and frequency, selecting the climate and terrain factor, and using the above equations, the site-specific probability curve for the received power can be calculated. The link reliability is simply the quantity 1 minus the outage probability which is determined by reading off the probability corresponding to the fade depth equal to the link fade margin.

The Rayleigh probability function, however, cannot be used to describe fade depths smaller than 20 dB (shallow fades). Such fades can contain a ray that is dominant, which requires a different mathematical model for their description and therefore, a general multipath fading model for received signal power is needed for link engineering at frequencies above 200 MHz, path lengths from 10 to 100 km, fade depths from 0 dB to 40 dB, and for a wide range of climates and terrains.

A very recent Canadian paper, "New Techniques for Predicting the Multipath Fading Distribution on VHF/LTHF/SHF Terrestrial Line-of-Sight Links in Canada," The Canadian Journal of Electrical and Computer Engineering, No. 2, Olsen and Segal, 1991, provides a such a needed methodology for fading estimates in the shallow fade depth region between 0 dB and 20 dB and for frequencies down to 100 MHz. The Olsen-Segal work is modified and used to meet the objectives of this invention.

The Olsen-Segal result for P in the deep-fade region (A>=25 dB) in percent is:

$$P = 10^{(G/10-5.7)} \, D^{3.6} \, F^{0.89} \, (1+|ep|)^{-1.4} \, 10^{(-A/10)}$$

where parameters not previously defined are
  G=climatic factor in dB
  |ep|=the absolute value of the magnitude of path inclination in mrad.

A relationship between G and the previously used climate factor C will be established below. The path inclination angle, ep, is the arctangent of a ratio where the numerator is the difference of the heights of the transmitting and receiving antennas, and the denominator is the path length. The exponents of the parameters differ from those in the previously stated fade occurrence factor R for CONUS. In general, such exponents and additional parameters in the fade occurrence factor are obtained empirically from experimental data.

The Olsen-Segal deep-fade region empirical results were developed from various experimental databases for path lengths from 7.5 to 95 km, and frequencies from 2 to 37 GHz. However, this model may also be used in the present invention for frequencies down to 200 MHz and path lengths from 10 to 100 km. Also, the path inclination effect will be assumed to be negligible, i.e., ep will be set equal to zero.

The new Olsen-Segal result is a probability function Ps for shallow fade depths (0 to 25 dB) in percent, $$Ps = 100 \, (1 - \exp(-10^{(-qA/20)}))$$

where the functional form of the shape factor q has been determined from experimental data. The values of the coefficients in q are determined from the deep-fade probability P, which is assumed to be known.

The Olsen-Segal work provides two important capabilities regarding the modeling of multipath fading on tactical LOS links. First, the shape factor q permits description of shallow fades. Second, the observation that available fading modeling techniques apply at frequencies down to 200 MHz permits extension of such techniques to tactical links. Given these capabilities, the geoclimatic factors may be calculated to describe a worldwide range of multipath fading conditions and their impact on tactical LOS links.

The model for the probability of fading is composed of the shallow-fade probability Ps and the deep-fade probability P. In this description, Ps describes the fading probability when A<25 dB, and P describes this probability when A>25 dB. Ps and P have the same value when A=25 dB. The Olsen-Segal approach also allows use of 35 dB as the value separating the regions for the use of Ps and P. The 35-dB value, however, imposes more constraints on the fading model than the 25-dB value and is therefore not recommended.

The shape factor q in terms of Ps is an empirically derived function that replicates experimentally observed shapes of shallow fading and merges Ps smoothly into P at the transition point at A=25 dB. The expression for this shape factor q is $$q = 2 + KA\,(qt + RA)$$

where KA and RA are empirically obtained functions of A $$KA = 10^{-0.016A}\,(1 + 0.3\,10^{-A/20})$$

$$RA = 4.3\,(10^{-A/20} + A/800)$$

The parameter qt is constant for a particular Ps curve. Its value is $$qt = ((r-2)/K25) - R25$$

where K25 and R25 are the respective values of KA and RA at A=25 dB. The parameter r (which is distinct from the fade occurrence factor R) is calculated from the deep-fade probability $$r = -0.8\,\log(-\ln(1 - P25/100))$$

where ln denotes the natural logarithm and P25 is the value of P at A=25 dB.

The shallow-fade probability Ps and the shape factor q describe shallow fading associated with atmospheric structures that cause multipath fading. The method is valid for such description when qt>=−2. For qt<−2, the shallow fading is too large to be accommodated by this invention. Such enhanced shallow fading can occur when multipath propagation is superimposed on depressed levels of received signal caused by ducting or temporary increase in terrain blockage due to the presence of a layer of moist air over a ground-based layer of dry air.

The final step in the adaptation of the Olsen-Segal model for worldwide use is to establish the linkage between the average deep fading in Canada and in CONUS. This can be done by calculating the fade depths for both Canada and CONUS at an identical probability in the deep-fade region using the same set of parameter values. The values selected are D=40 km, P=0.1 percent, and F=4 GHz since these represent those for which there are most extensive experimental data. This calculation yields a Canadian climate factor of G 5.8 dB corresponding to the average CONUS fading value of C=1. Since G=0 dB is the Canadian average, his result indicates that the average worst month fading in Canada is one quarter that of CONUS, as is expected for the colder Canadian climate.

Given the above statistical analysis and calculations, values for the parameters of path length (D), frequency (F), and climate (G) are selected. For example, it is recommended that G=0 dB for mountainous, dry, or northerly climates, e.g., Canada or Germany G=5.8 dB for average climates, CONUS G=15.8 dB for difficult climates, CONUS or International G=25.8 dB for very difficult International climates Further analysis would provide more detailed contours of G for other international climates.

The multipath fading analysis described above is therefore utilized to calculate link reliability as a function of fade margin (0 to 40 dB) for selected values of link path length (10 to 80 km) for frequencies of 300 MHz, 1600 MHz, and 4750 MHz. The latter are selected as representative of the 225-to-400 MHz, 1350-to-1850 MHz, and 4400-to-5000 MHz frequency bands, respectively. For each of the three frequencies, three values of the climate factor have been selected to span the climate range of application: average CONUS (5.8 dB), difficult CONUS or International (15.8 dB), and very difficult international (25.8 dB). Alternatively, the link fade margin has been calculated as a function of link path length for selected values of link reliability (90, 99, 99.9, and 99.99 percent).

Figure 5:
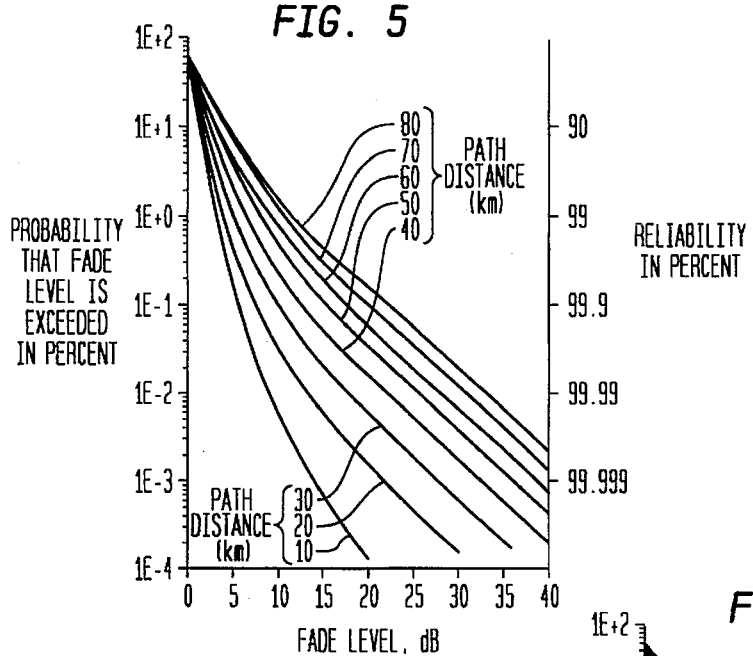
FIGS. 5, 6 and 7 are graphical representations of fading probabilities for average, difficult and very difficult climates as generated by the method of the present invention.
Figure 7:
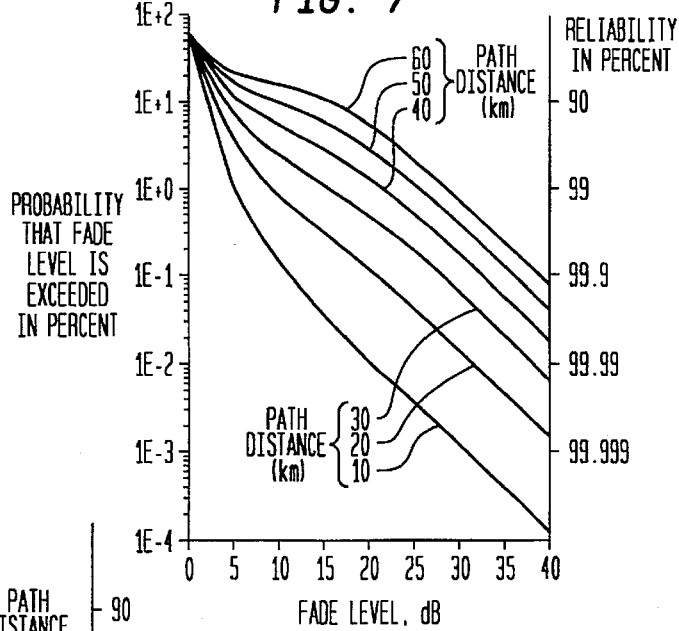
Figure 6:
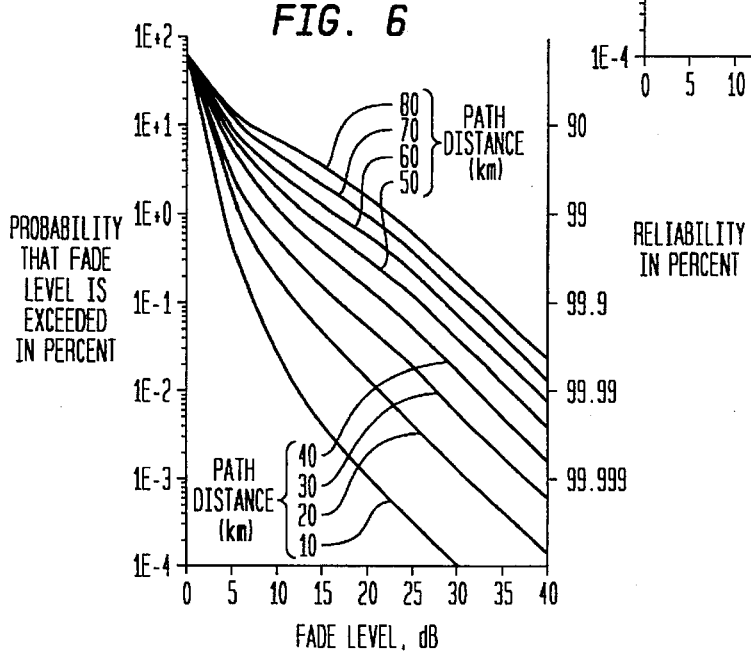
Figure 8:
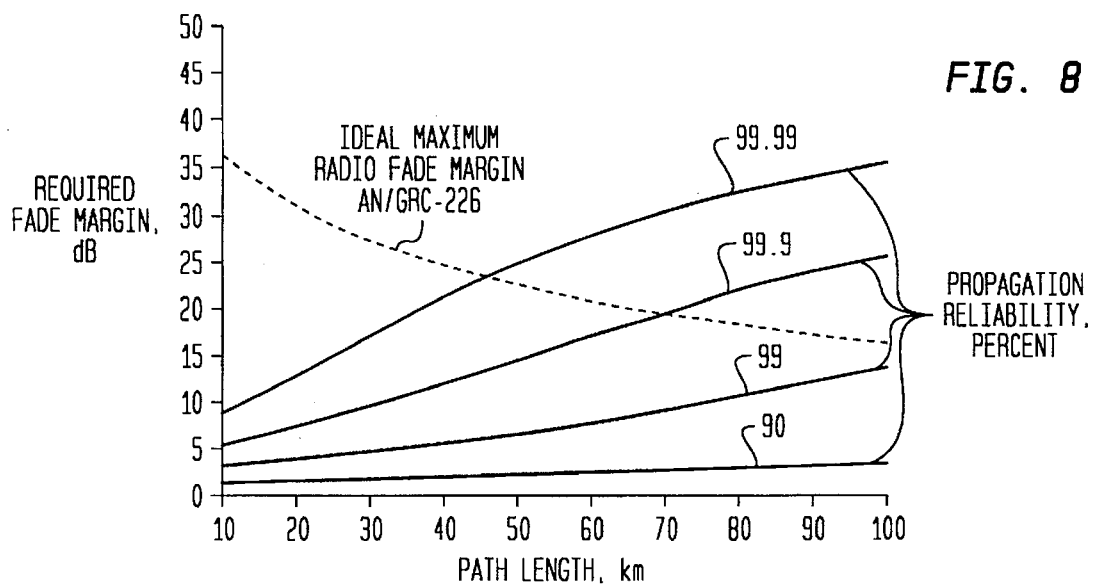
FIGS. 8, 9 and 10 are graphical representations of required fade margins versus path length for average, difficult and very difficult climates as generated by the method of the present invention.
Figure 9:
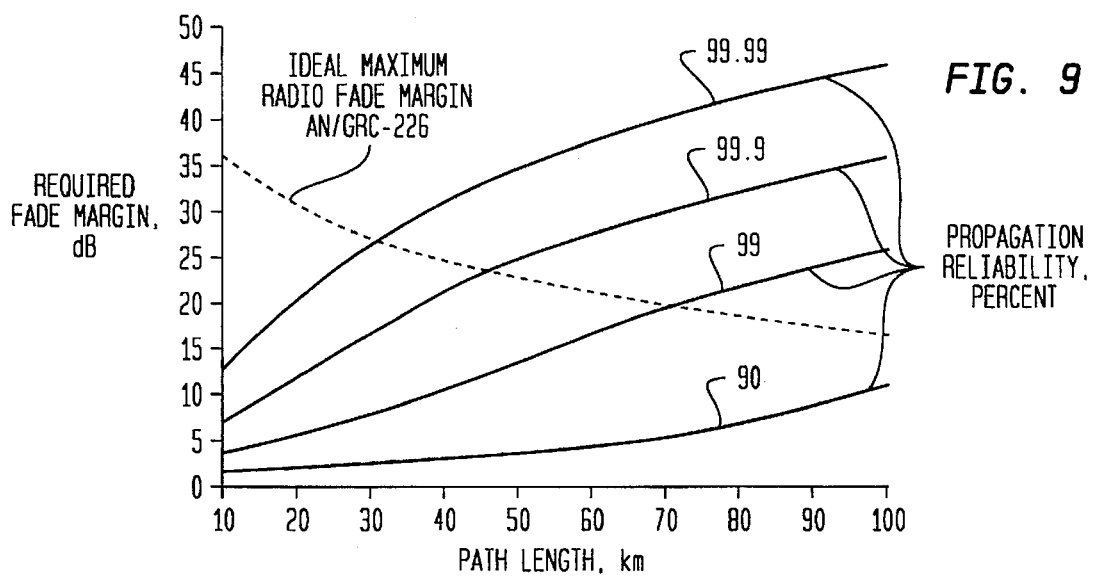
Figure 10:
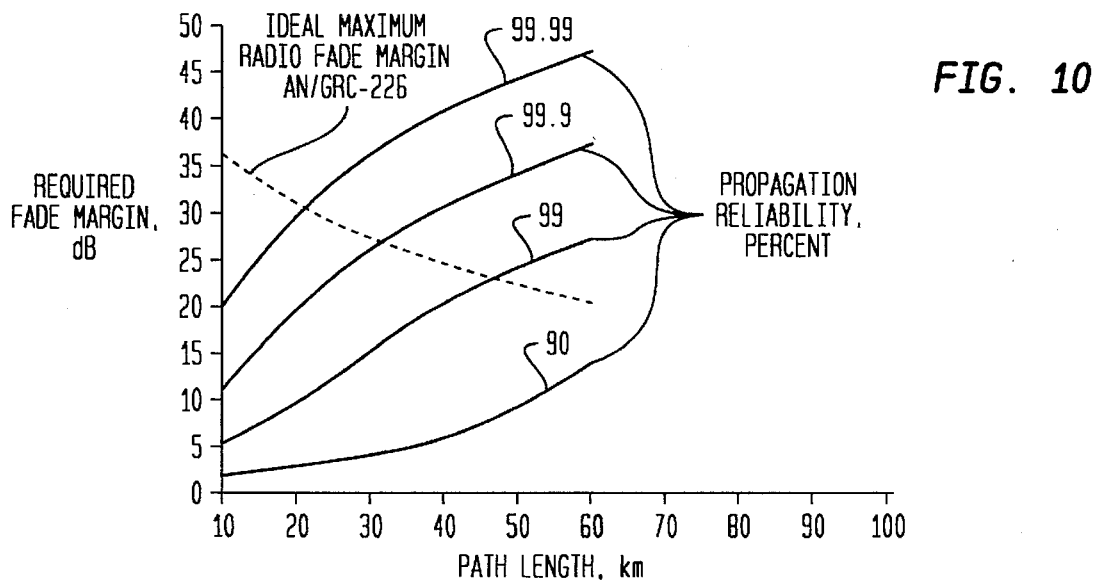

Typical results of the calculations are graphically shown in FIGS. 5–10. FIGS. 5–7 show the probability (reliability) results versus the required fade margin for a fixed path length at 300 MHz for average, difficult and very difficult climates, respectively and FIGS. 8–10 show the required fade margin versus link path length for a fixed reliability for average, difficult and very difficult climates, respectively. Both sets of graphs are illustrated as an example of the calculations which can be utilized in the present invention because usually applications of this nature begin with either a given path length or a given reliability.

Figure 11:
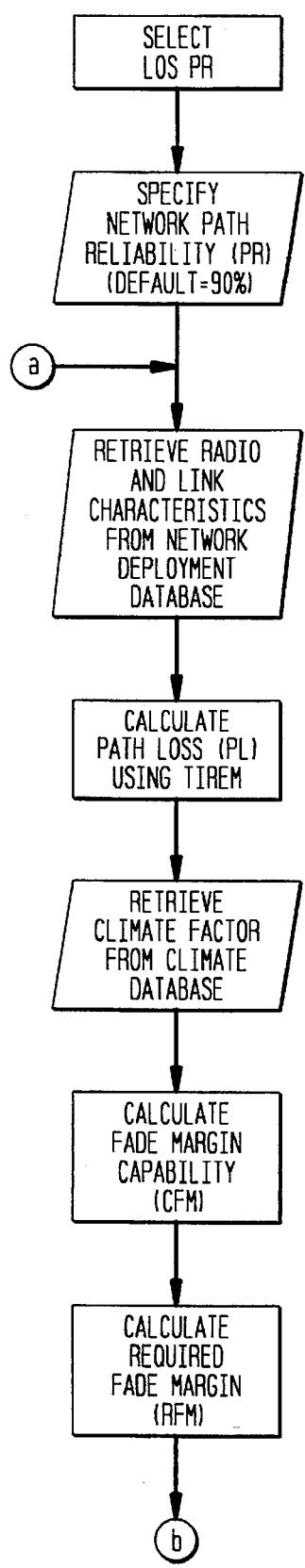
FIGS. 11, 12 and 13 are flow chart diagrams showing one embodiment of the present invention.
Figure 13:
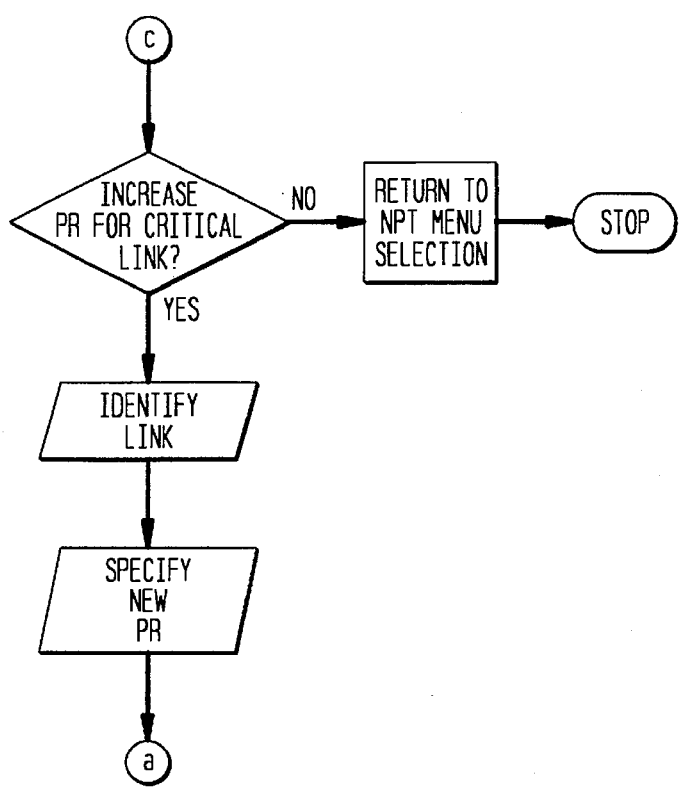
Figure 12:
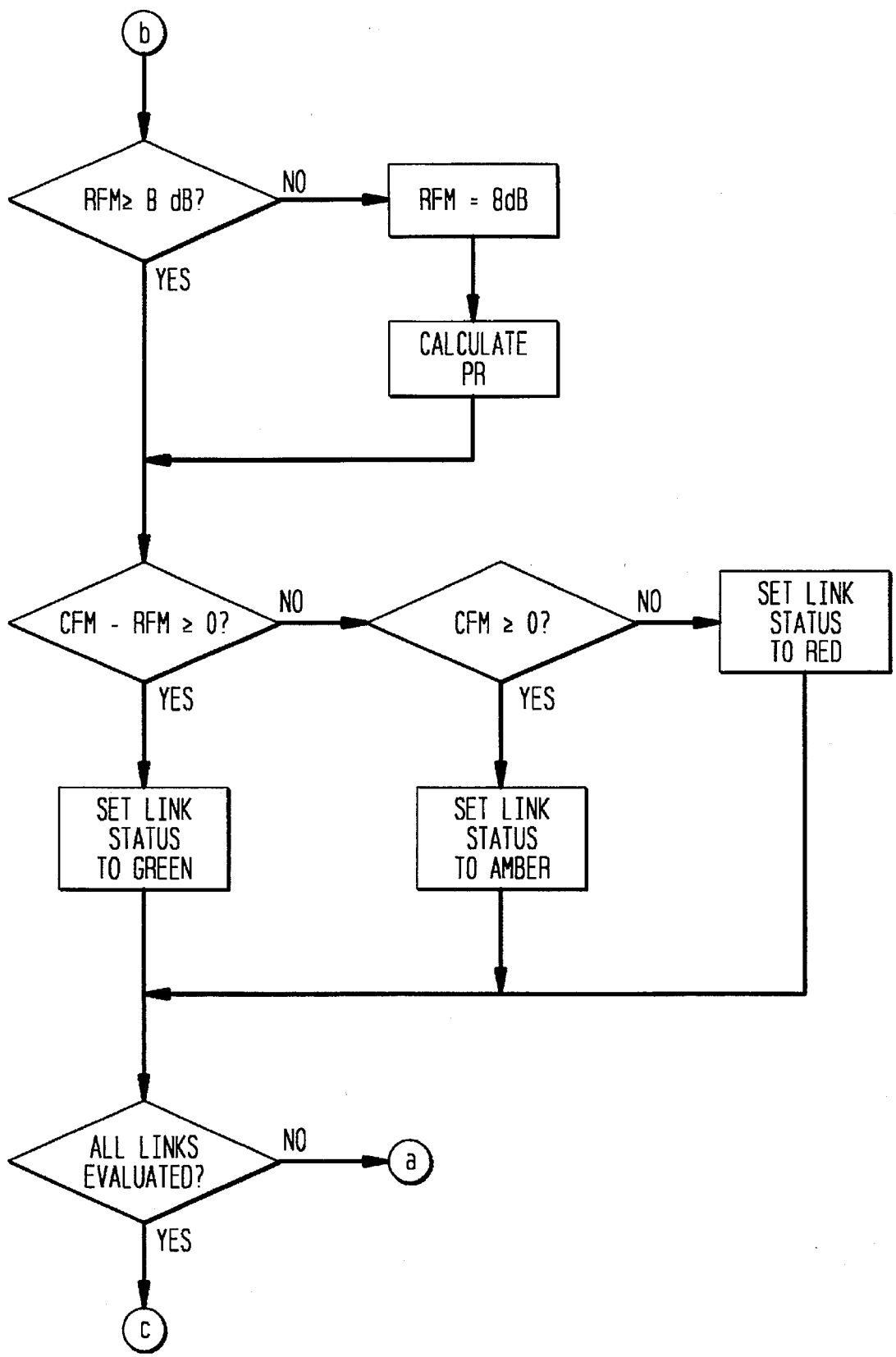

FIGS. 11–12 are flow diagrams illustrating one embodiment of the present invention. As shown, a path reliability PR is specified for any radio link on a network. Then, the radio and link characteristics, which are known values that are readily calculated, are retrieved from a database file and a fade margin capability (CFM) is determined utilizing a method commonly referred to as Terrain-Integrated Rough Earth Model (TIREM) and inputting known climate factors into this model. Thereafter, the required fade margin (RFM) is calculated using the method described above.

Given these results, the fade margin capabilities of the radio can be compared to the required fade margin and it can be readily determined whether the radio parameters are sufficient to establish a reliable radio link. As shown in FIG. 12, this may be represented in a color schematic wherein if the capability fade margin is less than zero and the difference between the capability fade margin and the required fade margin is less than zero, then the link status may be set to red (or a failed link). Likewise, if the difference between the capability fade margin and the required fade margin is less than zero, but the capability fade margin is greater than zero, then the link status is set to amber (or the link is susceptible to failure). Finally, if the difference between the capability fade margin and the required fade margin is greater than zero, then the link is set to green (or the link is reliable within a certain percentage).

If any link is unreliable, the physical parameters and the distance between the radio transmitters and receivers are altered to accommodate for an unreliable link as those skilled in the art would readily recognize. As such, the present method may be incorporated into any number of automated systems wherein the method is represented in a software program which automatically outputs the status of any radio link and/or automates the corrective action(s) necessary to establish a reliable radio link.

Although the present method has been described and illustrated in some detail, it is to be understood that the same is made by way of illustration and example only and is not to be taken by way of limitation, the spirit and scope of this invention being limited only by the terms of the appended claims.

What is claimed is:

1. An improved terrestrial, line of sight radio linked network having a predetermined number of terrestrial, line of sight radio transmitters and receivers, the terrestrial, line of sight radio transmitters and receivers having predetermined physical parameters and known multipath fade margin capabilities and being spaced over a predetermined distance and terrain, the improvement comprising:

an automated system and software program which automatically calculates a required multipath fade margin given a climatic factor, radio wave path inclination, desired reliability and radio frequency for each terrestrial, line of sight radio link;

means within the automated system and software program to compare the required multipath fade margin to the multipath fade margin capabilities;

means to alter the predetermined physical parameters of the terrestrial, line of sight radio transmitters and receivers if the difference between the multipath fade margin capabilities and the required multipath fade margin is less than or equal to zero; and means to alter the predetermined distance between the terrestrial, line of sight radio transmitters and receivers if the difference between the multipath fade margin capabilities and the required multipath fade margin is less than or equal to zero.

* * * * *